(12) United States Patent
Bemis

(10) Patent No.: US 7,168,524 B2
(45) Date of Patent: Jan. 30, 2007

(54) AIRCRAFT FLUID DRIP PAN SYSTEM

(76) Inventor: Christopher L. Bemis, 6546 W. Via Montoya Dr., Glendale, AZ (US) 85310

( * ) Notice: Subject to any disclaimer, the term of this patent is extended or adjusted under 35 U.S.C. 154(b) by 535 days.

(21) Appl. No.: 10/382,753

(22) Filed: Mar. 5, 2003

(65) Prior Publication Data

US 2003/0141150 A1    Jul. 31, 2003

(51) Int. Cl.
*F16N 31/00* (2006.01)
(52) U.S. Cl. .............. 184/106; 180/69.1; 296/38; 220/573; 428/137
(58) Field of Classification Search ............ 184/106; 180/69.1; 296/38; 220/573; 428/137
See application file for complete search history.

(56) References Cited

U.S. PATENT DOCUMENTS

| | | | | |
|---|---|---|---|---|
| 5,090,588 A | * | 2/1992 | Van Romer et al. | 220/573 |
| 5,603,362 A | * | 2/1997 | Telder | 141/98 |

* cited by examiner

*Primary Examiner*—Chong H. Kim
(74) *Attorney, Agent, or Firm*—Stoneman Law Offices, Ltd.; Martin L. Stoneman

(57) ABSTRACT

A system for improved collection and containment of fluids such as oils that commonly drip from an aircraft during service maintenance operations and during normal periods of storage. The system comprises a ground-supported drip pan incorporating a peripheral cutout adapted to accommodate a landing wheel of the aircraft to permit effective positioning under the engine. An embodiment for exterior use utilizing the weight of the aircraft to prevent movement of the system is also disclosed.

21 Claims, 4 Drawing Sheets

AIRCRAFT FLUID DRIP PAN SYSTEM

CROSS-REFERENCE TO RELATED APPLICATION

The present application is related to Applicant's prior U.S. Provisional Application No. 60/341,100, filed Nov. 29, 2001, entitled "AIRCRAFT OIL DRIP PAN", and U.S. Utility application Ser. No. 10/307,056, filed Nov. 29, 2002, the contents of which are herein incorporated by reference and are not admitted to be prior art with respect to the present invention by their mention in this cross-reference section.

BACKGROUND

This invention relates to providing a system for improved collection and containment of fluids, such as oils, that commonly drip from an aircraft during service maintenance operations and during normal periods of storage.

Typically, aircraft engines as well as other internal combustion engines employ oil, whether natural or synthetic, and sometimes other fluids for lubrication and cooling. When the aircraft is parked in a hangar or tied down on a tarmac, these fluids will commonly leak from the engine compartment, normally in small quantities. Even in small amounts, these fluids will collect on the parking pavement. The pavement surface, usually asphalt, absorbs these petroleum drippings and is affected by that absorption to the detriment and degradation of the parking surface and even of the environment.

In addition, part of the pre-flight inspection of aircraft by the crew before departure requires that small quantities of fuel be drained from the tanks and inspected to assure all condensed moisture is removed, and to confirm that the fuel is the proper grade and octane for the engines in the aircraft. In the past, this drained fuel has been discarded by being thrown on the pavement. This practice is no longer acceptable in these environmentally conscious times and is now forbidden by most airport management and environmental authorities, or frequently illegal.

A need has arisen for a means to dispose of or collect these residues safely and conveniently.

Since the engine compartment is normally above the nose wheel of single engine aircraft and commonly adjacent the main landing gear wheels of twin-engine aircraft, drip pans intended for use by automobiles cannot be used, not having an accommodation for the wheel.

OBJECTS OF THE INVENTION

A primary object and feature of the present invention is to provide a system to hold an accumulation of fluids that drip from an aircraft by the use of a drip pan placed under the engine compartment.

It is a further object and feature of the present invention to provide such a system that provides an effective means to dispose of such accumulations at the convenience of the operator or maintenance crews.

It is another object and feature of the present invention to provide such a system that addresses the need for a place of temporary containment of fuel contaminants.

It is a further object and feature of the present invention to provide such a system that incorporates a cutout for a landing wheel of the aircraft within the reservoir area of such drip pan to permit effective positioning of such a drip pan.

It is another object and feature of the present invention to provide such a system that has a web that fits under the aircraft wheel, thus effectively fixing the pan in place to prevent it from being moved by wind, weather, or theft.

It is a further object and feature of the present invention to provide such a system that permits convenient pouring of the collected fluids.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a fluid capture system, for collecting the discharge of fluids from the vicinity of an aircraft landing wheel, comprising in combination: fluid retaining means for retaining the fluids discharged from the aircraft; wherein such fluid retaining means comprises, fluid damming means for containing the fluids within such fluid retaining means, and contour means for permitting placement of such fluid retaining means in position below the aircraft adjacent the landing wheel of the aircraft; wherein such contour means permits the landing wheel to remain outside such fluid damming means while in position below the aircraft; and wherein the landing wheel is partially surrounded by such fluid damming means.

Moreover, it provides such a system further comprising: movement restricting means for restricting movement of such fluid capture system by utilizing the weight of the aircraft; wherein such movement restricting means permits the landing wheel of the aircraft to be moved over a portion of such fluid capture system. Additionally, it provides such a system wherein such movement restricting means is integral to such fluid retaining means.

Also, it provides such a system further comprising stiffening means for stiffening such fluid retaining means against deflection. In addition, it provides such a system wherein such fluid retaining means comprises indicia means for conveying information to a user of such system. And, it provides such a system wherein such fluid damming means comprises pour-assisting means for assisting in pouring and removal of the fluids collected within such fluid retaining means. Further, it provides such a system wherein such fluid capture system comprises a fluid impermeable plastic.

In accordance with another preferred embodiment hereof, this invention provides a fluid capture system, for collecting the discharge of fluids from the vicinity of an aircraft landing wheel, comprising in combination: at least one fluid retainer structured and arranged to retain the fluids discharged from the aircraft; wherein such at least one fluid retainer comprises, at least one fluid dam structured and arranged to contain the fluids within such at least one fluid retainer, and at least one contour structured and arranged to permit placement of such at least one fluid retainer in position below the aircraft adjacent the landing wheel of the aircraft; wherein such at least one contour permits the landing wheel to remain outside such at least one fluid dam while in position below the aircraft; and wherein the landing wheel is partially surrounded by such at least one fluid dam.

Even further, it provides such a system further comprising: at least one movement restrictor structured and arranged to restrict movement of such fluid capture system by utilizing the weight of the aircraft; wherein such at least one movement restrictor is structured and arranged to permit the landing wheel of the aircraft to be moved over at least one portion of such fluid capture system. Moreover, it provides such a system wherein such at least one movement restrictor is integral to such at least one fluid retainer. Additionally, it provides such a system further comprising at least one stiffener structured and arranged to stiffen such at least one fluid retainer against deflection. Also, it provides such a system wherein such at least one fluid retainer comprises indicia structured and arranged to convey information to a user. In addition, it provides such a system wherein such at least one fluid dam comprises at least one pour assister structured and arranged to assist in pouring and removal of the fluids collected within such at least one fluid retainer. And, it provides such a system wherein such fluid capture system comprises a fluid impermeable plastic.

In accordance with another preferred embodiment hereof, this invention provides a fluid capture system, for collecting the discharge of fluids from the vicinity of an aircraft landing wheel, comprising in combination: at least one drip pan to retain the fluids discharged from the aircraft; wherein such at least one drip pan comprises, at least one perimeter rim to contain the fluids within such at least one drip pan, at least one peripheral wheel cutout to permit placement of such at least one drip pan in a position below the aircraft adjacent to the landing wheel of the aircraft; wherein such at least one peripheral wheel cutout permits the landing wheel to remain outside such at least one perimeter rim while in position below the aircraft; and wherein the landing wheel is partially surrounded by such at least one perimeter rim.

Further, it provides such a system further comprising: at least one web to restrict movement of such fluid capture system by utilizing the weight of the aircraft; wherein such at least one web permits the landing wheel of the aircraft to be moved over at least one portion of such fluid capture system. Even further, it provides such a system wherein such at least one web is integral to such at least one drip pan.

Moreover, it provides such a system further comprising at least one stiffener rib to stiffen such at least one fluid drip pan against deflection.

Additionally, it provides such a system wherein such at least one drip pan comprises indicia to convey information to a user.

Also, it provides such a system wherein such at least one perimeter rim comprises at least one formed spout to assist in pouring and removal of the fluids collected within such at least one drip pan. In addition, it provides such a system wherein such fluid capture system comprises fluid impermeable plastic.

DETAILED DESCRIPTION OF A PREFERRED EMBODIMENT OF THE INVENTION

Figure 1:
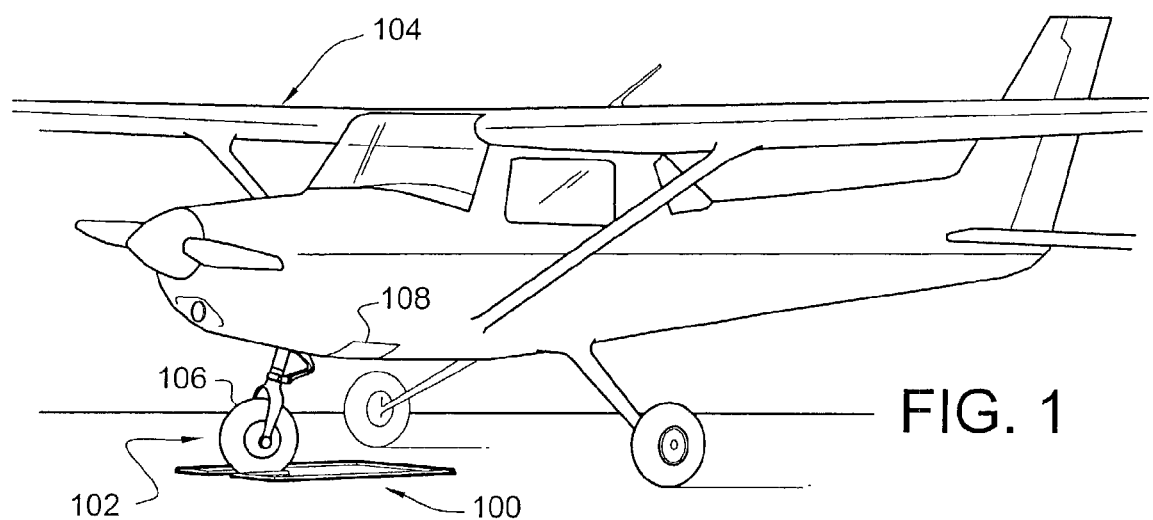
FIG. 1 is a perspective view of a drip pan system positioned around the front wheel area of an aircraft according to a preferred embodiment of the present invention.

Reference is now made to the drawings. FIG. 1 is a perspective view of drip pan system 100 positioned around the front wheel area 102 of aircraft 104 according to a preferred embodiment of the present invention. Because the engine compartments of light aircraft are typically located above the nose wheel 106 of single engine aircraft, as shown, and commonly adjacent to the main landing gear wheels of twin-engine aircraft, conventional drip pans intended for use by automobiles cannot be used, not having an accommodation for the wheel. Preferably, drip pan system 100 is adapted to permit effective positioning under the engine compartment 108 of aircraft 104 by incorporating peripheral wheel cutout 110, as shown in FIG. 2.

Figure 2:
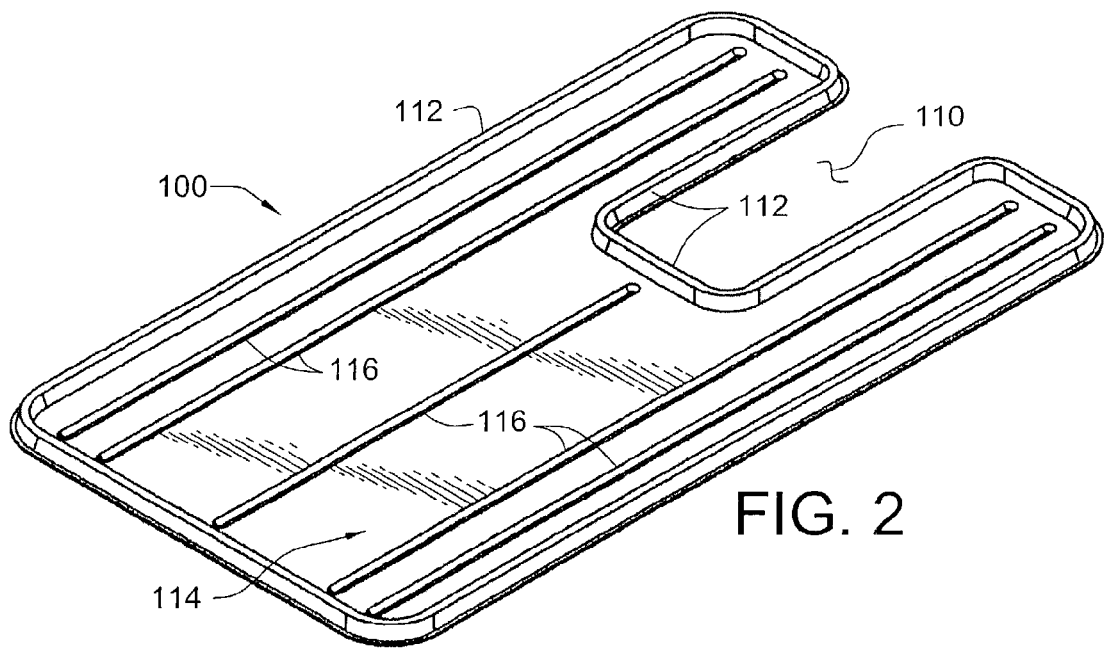
FIG. 2 is an isometric view of the drip pan system showing the wheel cutout, perimeter rim, fluid containment area, and stiffener ribs according to a preferred embodiment of the present invention.

FIG. 2 is an isometric view of the drip pan system 100 (embodying herein fluid retaining means for retaining the fluids discharged from the aircraft; and also embodying herein at least one fluid retainer structured and arranged to retain the fluids discharged from the aircraft) showing peripheral wheel cutout 110 (embodying herein contour means for permitting placement of such fluid retaining means in a position below the aircraft adjacent the landing wheel of the aircraft; and also embodying herein at least one contour structured and arranged to permit placement of such at least one fluid retainer in a position below the aircraft adjacent the landing wheel of the aircraft), perimeter rim 112 (embodying herein fluid damming means for containing the fluids within such fluid retaining means; and also embodying herein at least one fluid dam structured and arranged to contain the fluids within such at least one fluid retainer), fluid containment area 114 and stiffener ribs 116 (embodying herein stiffening means for stiffening such fluid retaining means against deflection; and also embodying herein at least one stiffener structured and arranged to stiffen such at least one fluid retainer against deflection) according to the preferred embodiment of the present invention. In the preferred embodiment, the drip pan system 100 is pressure or vacuum formed from sheet plastic, preferably, high-density polyethylene—although, under appropriate circumstances, drip pan system 100 may be formed from stamped sheet metal or injected-molded plastic.

Figure 3:
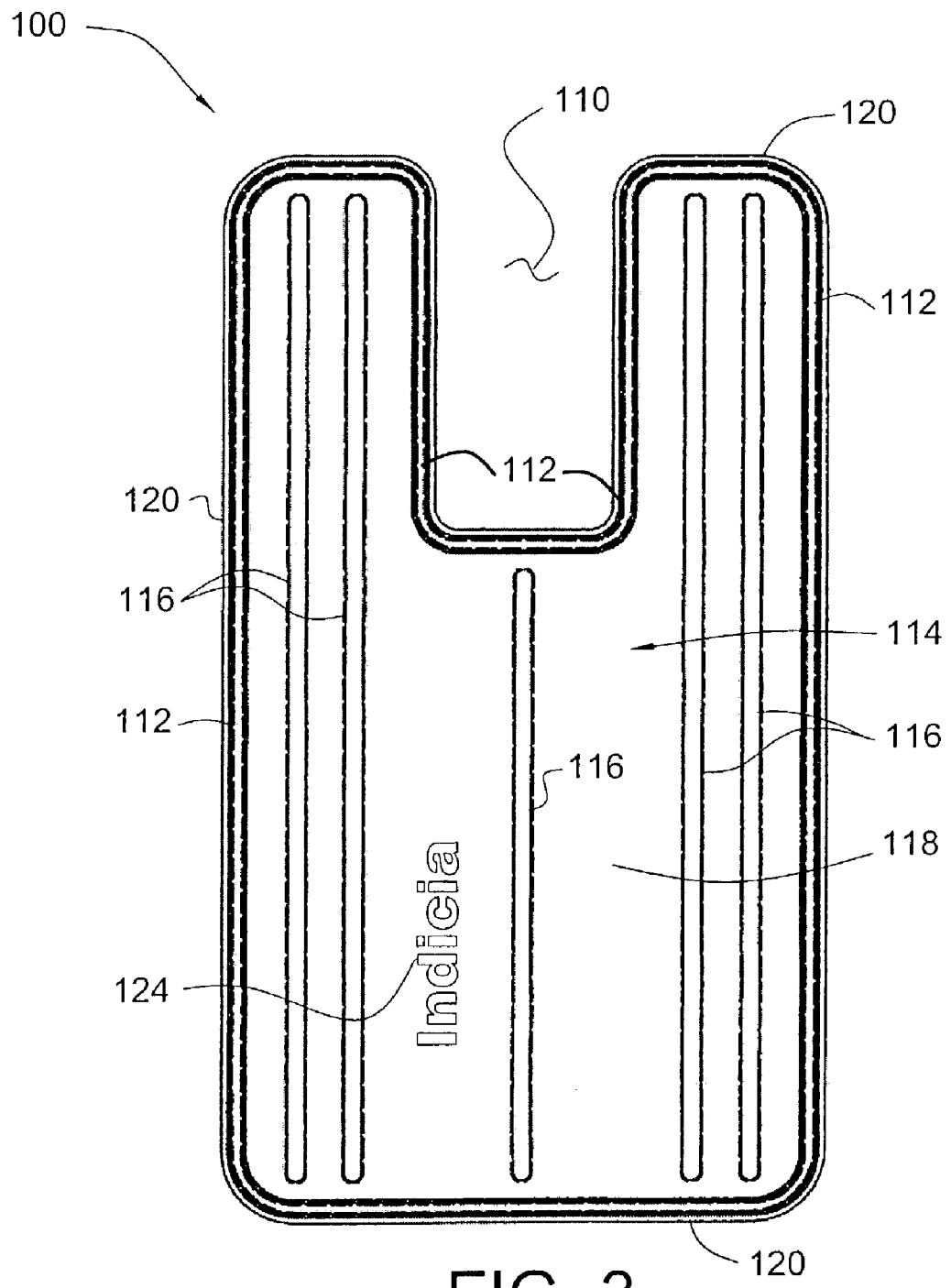
FIG. 3 is a top view of the top of the drip pan system according to a preferred embodiment shown in FIG. 2.

FIG. 3 is a top view of the top of drip pan system 100 according to the preferred embodiment of FIG. 2. Preferably, fluid containment area 114 comprises an essentially rectangular, planar panel 118 having a perimeter rim 112 and a perimeter edge 120, as shown. Preferably, perimeter rim 112 extends continuously around planar panel 118 and between perimeter edge 120 to form a dam-like structure surrounding fluid containment area 114, as shown. Peripheral wheel cutout 110 comprises an essentially rectangular shaped indentation, preferably of a size to accommodate all aircraft wheels common to light aircraft, and is preferably formed within a narrow end of drip pan system 100, as shown. Although, under appropriate circumstances, drip pan system 100 may conform to any desired size or capacity, drip pan system 100 has a preferred width of about 25" and a preferred length of about 45", as shown. Preferably, peripheral wheel cutout 110 has a clear inside width of about 7½" and a clear inside length of about 18", as shown. Preferably, perimeter rim 112 has a height of about ⅝" and a width of between about ½" and ⅝", from top to bottom.

A plurality of stiffener ribs 116 are preferably molded or stamped into the surface of planar panel 118 to add strength to drip pan system 100 by reducing deflection within planar panel 118 under load.

Also, as shown in FIG. 3, planar panel 118 is sufficiently sized such that information can be communicated to the user through the means of indicia 124. Preferably, indicia 124 provides information about the trade name used to identify the drip pan system. However, indicia 124 may also provide information to the user concerning the use and care of the system.

Figure 4:
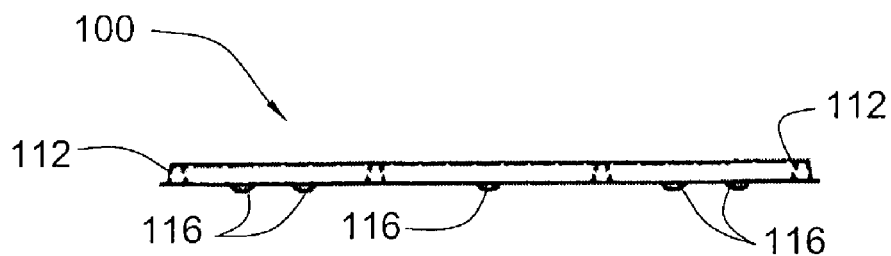
FIG. 4 is a front view of the drip pan system according to the preferred embodiment shown in FIG. 2.

FIG. 4 is a front view of the drip pan system 100 according to the preferred embodiment of FIG. 2. Perimeter rim 112 preferably comprises an integrally molded element having an inverted "U"-shaped sectional profile as indicated within FIG. 4 by dashed lines. Preferably, perimeter rim 112 is of a height suitable to form a reservoir of a capacity to hold any predictable volume of fluid accumulations. The capacity of the preferred embodiment, as shown in FIG. 2, is about two U.S. gallons.

Figure 5:
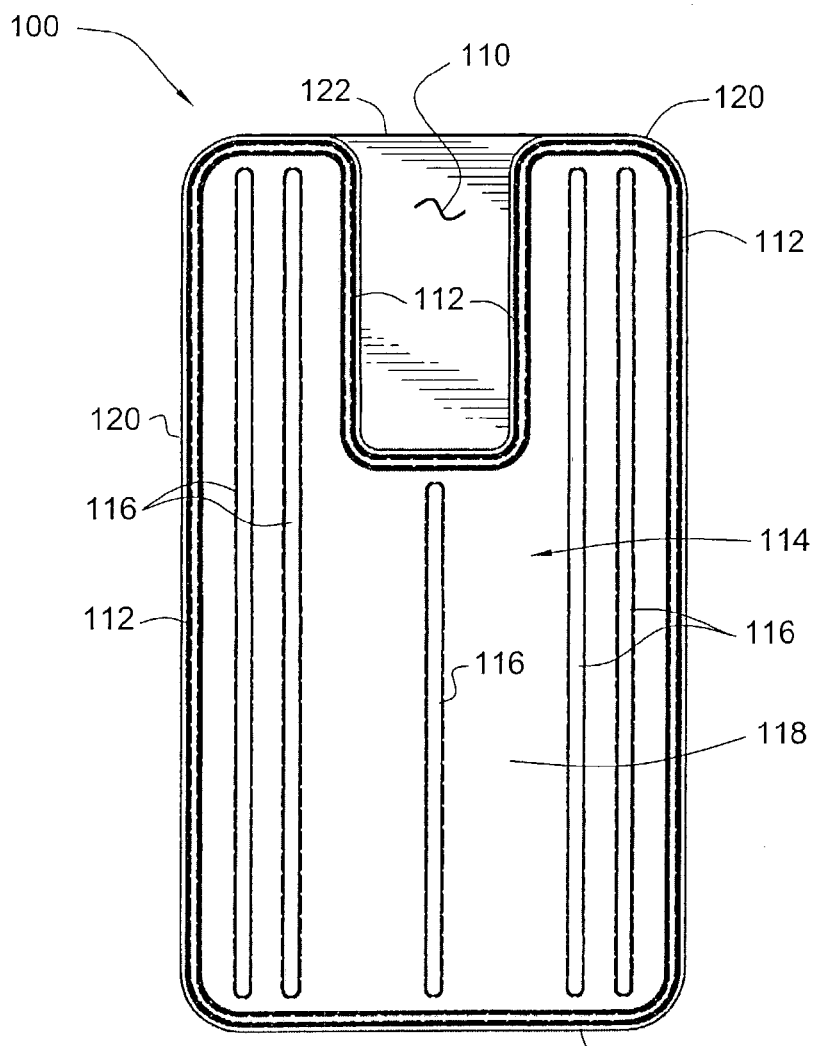
FIG. 5 is a top view of the drip pan system showing the wheel insert, perimeter rim and stiffener ribs and further showing the web in the insert area upon which the aircraft wheel rests to secure the pan from blowing away or being stolen according to another preferred embodiment of the present invention.

FIG. 5 is a top view of the drip pan system 100 showing peripheral wheel cutout 110, perimeter rim 112, fluid containment area 114, stiffener ribs 116 and further showing web 122 (embodying herein movement restricting means for restricting movement of such fluid capture system by utilizing the weight of the aircraft; and also embodying herein at least one movement restrictor structured and arranged to restrict movement of such fluid capture system by utilizing the weight of the aircraft) within peripheral wheel cutout 110 upon which the aircraft wheel rests, to secure drip pan system 100 from blowing away or being stolen according to another preferred embodiment of the present invention.

Figure 6:
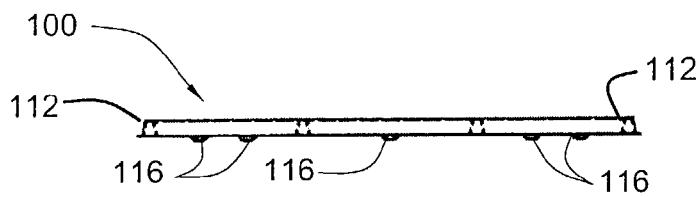
FIG. 6 is a front view of the drip pan system according to the preferred embodiment shown in FIG. 5.

FIG. 6 is a front view of the drip pan system 100 according to the preferred embodiment of FIG. 5.

Figure 7:
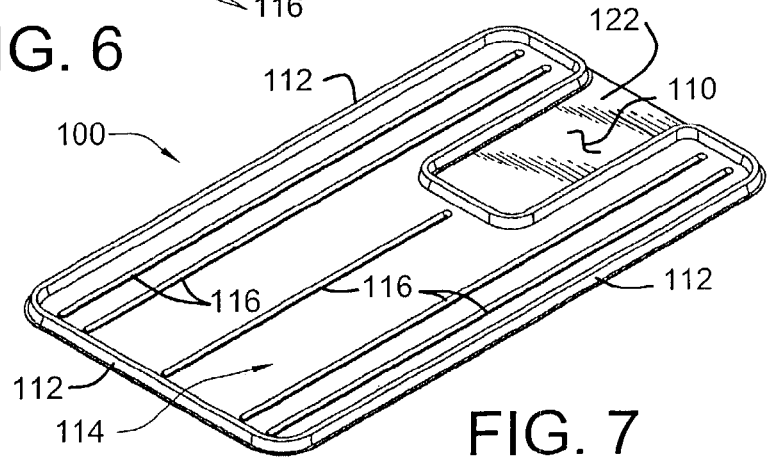
FIG. 7 is an isometric view of the top of the drip pan system according to the preferred embodiment shown in FIG. 5.

FIG. 7 is an isometric view of the top of the drip pan system 100, showing web 122 within peripheral wheel cutout 110, according to the preferred embodiment of FIG. 5.

Figure 8:
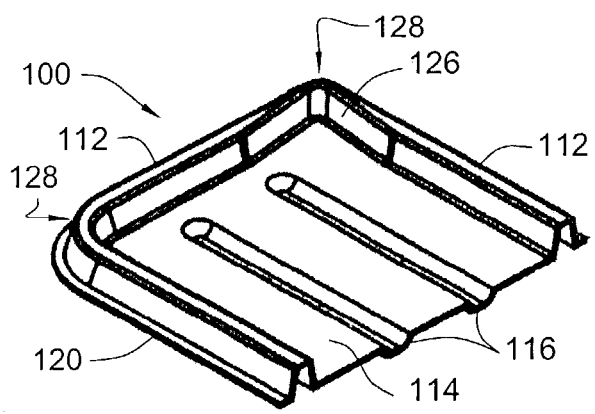
FIG. 8 is a partial isometric view of a corner pouring spout configuration according to yet another preferred embodiment of the present invention.

FIG. 8 is a partial isometric view of drip pan system 100 illustrating formed spout 126 (embodying herein pour-assisting means for assisting in pouring and removal of the fluids collected within such fluid retaining means; also embodying herein at least one pour assister structured and arranged to assist in pouring and removal of the fluids collected within such at least one fluid retainer) according to yet another preferred embodiment of the present invention. Under appropriate circumstances, it may be preferable to have in one or more corner(s) 128 of fluid containment area 114, formed spout 126 integrally molded within perimeter rim 112, as shown, to facilitate pouring accumulated fluids into a container for removal without spilling. Preferably, formed spout 126 comprises a narrowing of the inverted "U"-shaped profile of perimeter rim 112, as shown.

Figure 9:
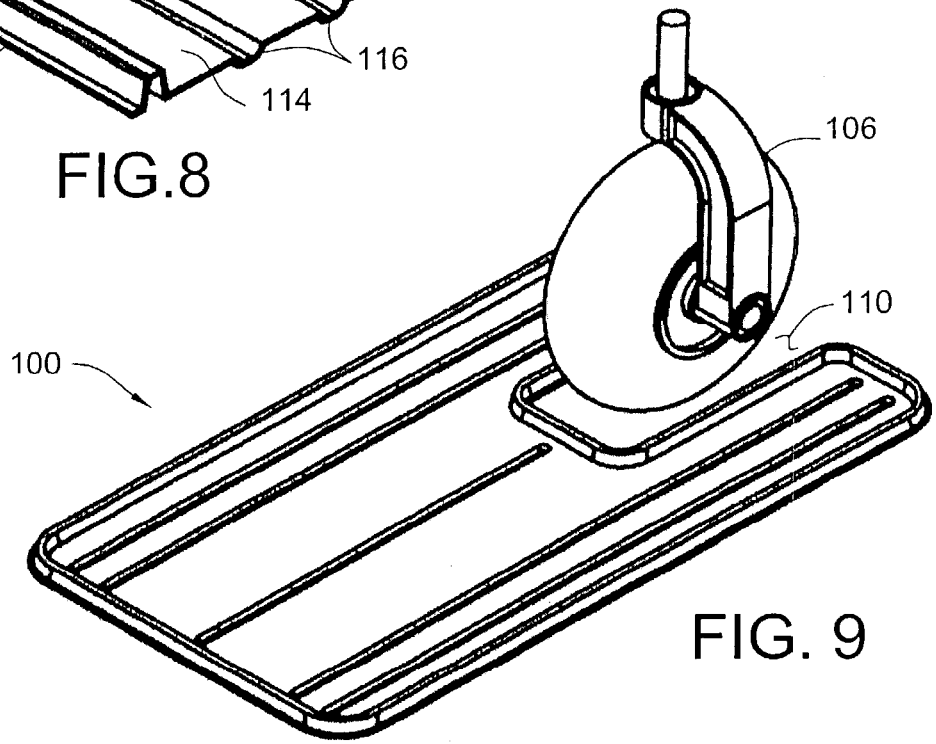
FIG. 9 is a perspective view of the drip pan system positioned around an aircraft wheel according to the preferred embodiment shown in FIG. 2.

FIG. 9 is a perspective view of drip pan system 100 positioned around an aircraft nose wheel 106 according to the preferred embodiment of FIG. 2. Although drip pan system 100 may be used inside or outside an enclosed hanger, the embodiment of FIG. 9 is preferably used indoors where the potential of loss due to wind or theft is negligible.

Figure 10:
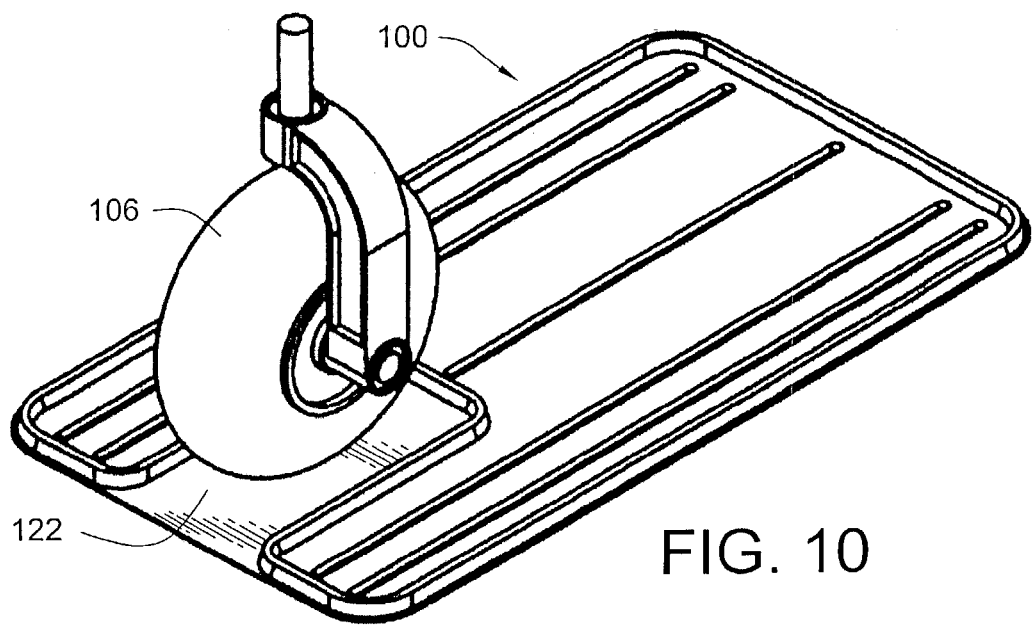
FIG. 10 is a perspective view of the drip pan system with the web of the drip pan system secured by the aircraft wheel.

FIG. 10 is a perspective view of drip pan system 100 with web 122 of drip pan system 100 secured by the weight of aircraft nose wheel 106, as shown. The embodiment of FIG. 10 is preferably used exterior of an enclosed hanger where the potential of loss due to wind or theft is greater.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. A fluid capture system, for collecting the discharge of fluids from the vicinity of an aircraft landing wheel, comprising in combination:
    a) fluid retaining means for retaining the fluids discharged from the aircraft;
    b) wherein said fluid retaining means comprises,
        i) fluid damming means for containing the fluids within said fluid retaining means, and
        ii) contour means for permitting placement of said fluid retaining means in position below the aircraft adjacent the landing wheel of the aircraft;
    c) wherein said contour means permits the landing wheel to remain outside said fluid damming means while in position below the aircraft; and
    d) wherein the landing wheel is partially surrounded by said fluid damming means.

2. The system according to claim 1 further comprising:
    a) movement restricting means for restricting movement of said fluid capture system by utilizing the weight of the aircraft;
    b) wherein said movement restricting means permits the landing wheel of the aircraft to be moved over a portion of said fluid capture system.

3. The system according to claim 2 wherein said movement restricting means is integral to said fluid retaining means.

4. The system according to claim 1 further comprising stiffening means for stiffening said fluid retaining means against deflection.

5. The system according to claim 1 wherein said fluid retaining means comprises indicia means for conveying information to a user of said system.

6. The system according to claim 1 wherein said fluid damming means comprises pour-assisting means for assisting in pouring and removal of the fluids collected within said fluid retaining means.

7. The system according to claim 1 wherein said fluid capture system comprises a fluid impermeable plastic.

8. A fluid capture system, for collecting the discharge of fluids from the vicinity of an aircraft landing wheel, comprising in combination:
    a) at least one fluid retainer structured and arranged to retain the fluids discharged from the aircraft;
    b) wherein said at least one fluid retainer comprises, i) at least one fluid dam structured and arranged to contain the fluids within said at least one fluid retainer, and
ii) at least one contour structured and arranged to permit placement of said at least one fluid retainer in position below the aircraft adjacent the landing wheel of the aircraft;
c) wherein said at least one contour permits the landing wheel to remain outside said at least one fluid dam while in position below the aircraft; and
d) wherein the landing wheel is partially surrounded by said at least one fluid dam.

9. The system according to claim 8 further comprising:
a) at least one movement restrictor structured and arranged to restrict movement of said fluid capture system by utilizing the weight of the aircraft;
b) wherein said at least one movement restrictor is structured and arranged to permit the landing wheel of the aircraft to be moved over at least one portion of said fluid capture system.

10. The system according to claim 9 wherein said at least one movement restrictor is integral to said at least one fluid retainer.

11. The system according to claim 8 further comprising at least one stiffener structured and arranged to stiffen said at least one fluid retainer against deflection.

12. The system according to claim 8 wherein said at least one fluid retainer comprises indicia structured and arranged to convey information to a user.

13. The system according to claim 8 wherein said at least one fluid dam comprises at least one pour assister structured and arranged to assist in pouring and removal of the fluids collected within said at least one fluid retainer.

14. The system according to claim 8 wherein said fluid capture system comprises a fluid impermeable plastic.

15. A fluid capture system, for collecting the discharge of fluids from the vicinity of an aircraft landing wheel, comprising in combination:

a) at least one drip pan to retain the fluids discharged from the aircraft;
b) wherein said at least one drip pan comprises,
i) at least one perimeter rim to contain the fluids within said at least one drip pan,
ii) at least one peripheral wheel cutout to permit placement of said at least one drip pan in a position below the aircraft adjacent to the landing wheel of the aircraft;
c) wherein said at least one peripheral wheel cutout permits the landing wheel to remain outside said at least one perimeter rim while in position below the aircraft; and
d) wherein the landing wheel is partially surrounded by said at least one perimeter rim.

16. The system according to claim 15 further comprising:
a) at least one web to restrict movement of said fluid capture system by utilizing the weight of the aircraft;
b) wherein said at least one web permits the landing wheel of the aircraft to be moved over at least one portion of said fluid capture system.

17. The system according to claim 16 wherein said at least one web is integral to said at least one drip pan.

18. The system according to claim 15 further comprising at least one stiffener rib to stiffen said at least one fluid drip pan against deflection.

19. The system according to claim 15 wherein said at least one drip pan comprises indicia to convey information to a user.

20. The system according to claim 15 wherein said at least one perimeter rim comprises at least one formed spout to assist in pouring and removal of the fluids collected within said at least one drip pan.

21. The system according to claim 15 wherein said fluid capture system comprises fluid impermeable plastic.

* * * * *

UNITED STATES PATENT AND TRADEMARK OFFICE
CERTIFICATE OF CORRECTION

PATENT NO. : 7,168,524 B2
APPLICATION NO. : 10/382753
DATED : January 30, 2007
INVENTOR(S) : Christopher L. Bemis It is certified that error appears in the above-identified patent and that said Letters Patent is hereby corrected as shown below:

Column 6, line 37, d) OMIT: "wherein the landing wheel is partially surrounded by said fluid damming means."

Column 6, line 37, d) ADD: --wherein said contour means is adapted to permit at least three sides of the landing wheel to be partially surrounded by said fluid damming means;
e) wherein said fluid retaining means comprises substantially one integral piece structured and arranged to be placed substantially flat on the ground in position below the aircraft.--

Column 7, line 11, d) OMIT: "wherein the landing wheel is partially surrounded by said at least one fluid dam."

Column 7, line 11, d) ADD: --wherein said at least one contour is adapted to permit at least three sides of the landing wheel to be partially surrounded by said at least one fluid dam;
e) wherein said at least one fluid retainer comprises substantially one integral piece structured and arranged to be placed substantially flat on the ground in position below the aircraft.--

Column 8, line 14, d) OMIT: "wherein the landing wheel is partially surrounded by said at least one perimeter perimeter rim."

UNITED STATES PATENT AND TRADEMARK OFFICE
CERTIFICATE OF CORRECTION

PATENT NO. : 7,168,524 B2
APPLICATION NO. : 10/382753
DATED : January 30, 2007
INVENTOR(S) : Christopher L. Bemis It is certified that error appears in the above-identified patent and that said Letters Patent is hereby corrected as shown below:

Column 8, line 14, d) ADD: --wherein said at least one peripheral wheel cutout is adapted to permit at least three sides of the landing wheel to be partially surrounded by said at least one perimeter rim;
e) wherein said at least one drip pan comprises substantially one integral piece structured and arranged to be placed substantially flat on the ground in position below the aircraft.--

Signed and Sealed this

Thirty-first Day of July, 2007

JON W. DUDAS
*Director of the United States Patent and Trademark Office*